United States Patent

Tamori

[11] Patent Number: 5,515,738
[45] Date of Patent: May 14, 1996

[54] PIEZOELECTRIC SURFACE PRESSURE INPUT PANEL

[75] Inventor: Teruhiko Tamori, Saitama, Japan

[73] Assignee: Enix Corporation, Shinjuku, Japan

[21] Appl. No.: 325,673

[22] Filed: Oct. 18, 1994

[30] Foreign Application Priority Data

Oct. 19, 1993 [JP] Japan .................. 5-285877

[51] Int. Cl.⁶ ........................................ G01L 5/00
[52] U.S. Cl. ................ 73/862.046; 73/862.626; 310/338
[58] Field of Search ............. 73/862.046, 862.68, 73/862.662, 862.628; 310/338, 366

[56] References Cited

U.S. PATENT DOCUMENTS

| | | | |
|---|---|---|---|
| 4,356,422 | 10/1982 | van Maannen | 310/322 |
| 4,634,917 | 1/1987 | Dvorsky et al. | 310/338 |
| 4,644,801 | 2/1987 | Kastanovich | 73/862.046 |
| 4,703,663 | 11/1987 | Oppermann | 73/862.628 |
| 5,209,126 | 5/1993 | Grahn | 73/862.046 |

FOREIGN PATENT DOCUMENTS

| | | |
|---|---|---|
| 0212695 | 3/1987 | European Pat. Off. . |
| 0397539 | 11/1990 | European Pat. Off. . |

OTHER PUBLICATIONS

Patent Abstracts of Japan, vol. 17, No. 384 (P–1575) Jul. 19, 1993 & JP-A—5 061 966 (Matsushita Electric Ind) Mar. 12, 1993, Abstract.

Primary Examiner—Richard Chilcot
Assistant Examiner—Ronald L. Biegel
Attorney, Agent, or Firm—Townsend and Townsend and Crew

[57] ABSTRACT

An active matrix surface pressure input panel comprises a piezoelectric sheet having electrode lines formed thereon and coupled to a piezoelectric body for vibrating the sheet at a given reference frequency. When an object having surface variations, such as a fingertip, is pressed against the sheet, corresponding underlying portions of the sheet vibrate at frequencies that differ from the reference frequency. The local vibration frequencies are detected by electrode lines applied to opposing sides of the sheet, preferably in an X-Y grid, so that the relative locations of the sheet from where the detected signals emanate can be determined. The surface pressure input panel exhibits high definition over a relatively large detection area so that complicated surfaces, such as fingerprints, can be accurately detected and reproduced.

20 Claims, 3 Drawing Sheets

PIEZOELECTRIC SURFACE PRESSURE INPUT PANEL

FIELD OF THE INVENTION

This invention relates to surface pressure input panels generally and more specifically to a piezoelectric surface pressure input panel suitable for detecting complicated surface contours and irregularities such as a fingerprint pattern.

BACKGROUND OF THE INVENTION

The inside surface of the fingertip has intricate contours that are unique to each individual. This has made the fingerprint pattern an important vehicle for identification, particularly for law enforcement purposes. To facilitate identification via fingerprints, efforts have been made to develop fingerprint detection devices capable of electronically mapping an individual fingerprint pattern. Accurately mapping the contour of each person's fingertip, however, has proven to be a difficult and expensive task. This is because each fingerprint pattern is made up of a large number of convex portions, or ridges, separated by concave portions or grooves that generally extend in random directions over the fingertip. These ridges and grooves have minute dimensions, on the order of 100 μm, making them difficult to detect.

Conventional fingerprint detection devices generally employ a surface pressure input panel that includes a contact sheet that changes in some manner when it is engaged by the ridges and grooves of the fingertip. One such device comprises a conductive rubber sheet that undergoes local variations in conductivity when engaged by a surface with a pressure differential. Similar devices include a resistive film that varies in resistance with changes in surface pressure. These devices employ a means for detecting the changes in the contact sheet or film in order to electronically map the contour of the fingertip. The detection means, however, typically has difficulty detecting small pressure changes, particularly when a non-uniform pressing force is applied or the fingertip is contaminated with grease, sweat or the like. Therefore, these devices are often incapable of accurately detecting the small surface variations necessary for mapping the contour of a fingertip.

Other fingerprint detection devices have attempted to overcome this problem by employing piezoelectric thin films with MOS field-effect transistors to detect small surface variations (e.g, see Japanese Patent Application Nos. Sho-62-2132, Sho-63-208734, Hei-3-287034 and Hei-5-61966). These devices, however, generally require complicated manufacturing techniques and relatively expensive materials, such as silicon semiconductor substrates. Although these devices can produce high definition, they are difficult to manufacture and, therefore, are very expensive. Accordingly, manufacturing these devices to map a large detection area, such as a fingerprint pattern (which is very large compared to the size of the individual surface changes or irregularities) is not presently feasible.

SUMMARY OF THE INVENTION

The present invention is directed to an inexpensive surface pressure input panel capable of detecting complicated surface contours such as a fingerprint pattern. To accomplish this, the surface pressure input panel of the present invention comprises a piezoelectric sheet having electrode lines formed thereon which are coupled to an oscillator for vibrating the piezoelectric sheet at a given reference frequency. When an object with surface variations is pressed against the sheet, corresponding deflected portions of the sheet will vibrate at frequencies that differ from the reference frequency. The sheet generates electric signals which reflect local vibration frequencies. The electric signals are picked up by the electrode lines, which are preferably arranged in an X-Y grid, for detection of the generated signals and for determining the relative locations of the deflected portions of the sheet.

Preferably, the piezoelectric sheet is configured to oscillate at frequencies that differ from the reference frequency by an amount proportional to the pressure applied to predetermined portions or areas of the sheet. In this manner, the input panel can generate a plurality of different electric signals that are representative of the varying degrees of pressure applied by the object to the sheet, e.g., due to surface variations (ridges and grooves) of a fingerprint. The electrode lines are preferably formed on opposing surfaces of the sheet and comprise first and second groups (e.g., X and Y) that intersect each other at intersection points to form a matrix pattern on the sheet. This allows the generated signals to be correlated with the vibrating portions of the sheet from where the signals emanate so that a surface pressure differential corresponding to the contour of the object can be mapped and reproduced.

In a preferred configuration, the piezoelectric sheet is oscillated by a piezoelectric body coupled to one surface of the sheet. The piezoelectric body has a ceramic plate sandwiched between conductive films such that, when an electric current is applied across the conductive films, the body will oscillate at a particular frequency. The body is secured to the sheet, e.g. by laminating the two together, such that this frequency can be directly transmitted to the sheet for comparison with local vibration frequencies generated at intersection points of the electrode lines as a result of pressure applied to the sheet.

When installed, the pressure input panel of the invention is coupled to an electrically driven oscillator and X and Y direction switches. The oscillator applies a given oscillating frequency to the piezoelectric body and the X and Y direction switches cycle through the groups of electrode lines so that a detection circuit can correlate the generated electrical signals with the location of the deflected sheet portions from which they emanate. A detection circuit compares the electrical signals with the oscillating frequency to create difference signals, which are then appropriately processed so that the contour of the fingerprint can be reproduced. Thus, the invention provides a relatively inexpensive surface pressure input panel that exhibits high definition over a relatively large detection area so that extremely complicated surfaces, such as fingerprints, can be accurately detected and reproduced.

DESCRIPTION OF THE PREFERRED EMBODIMENT

Figure 1:
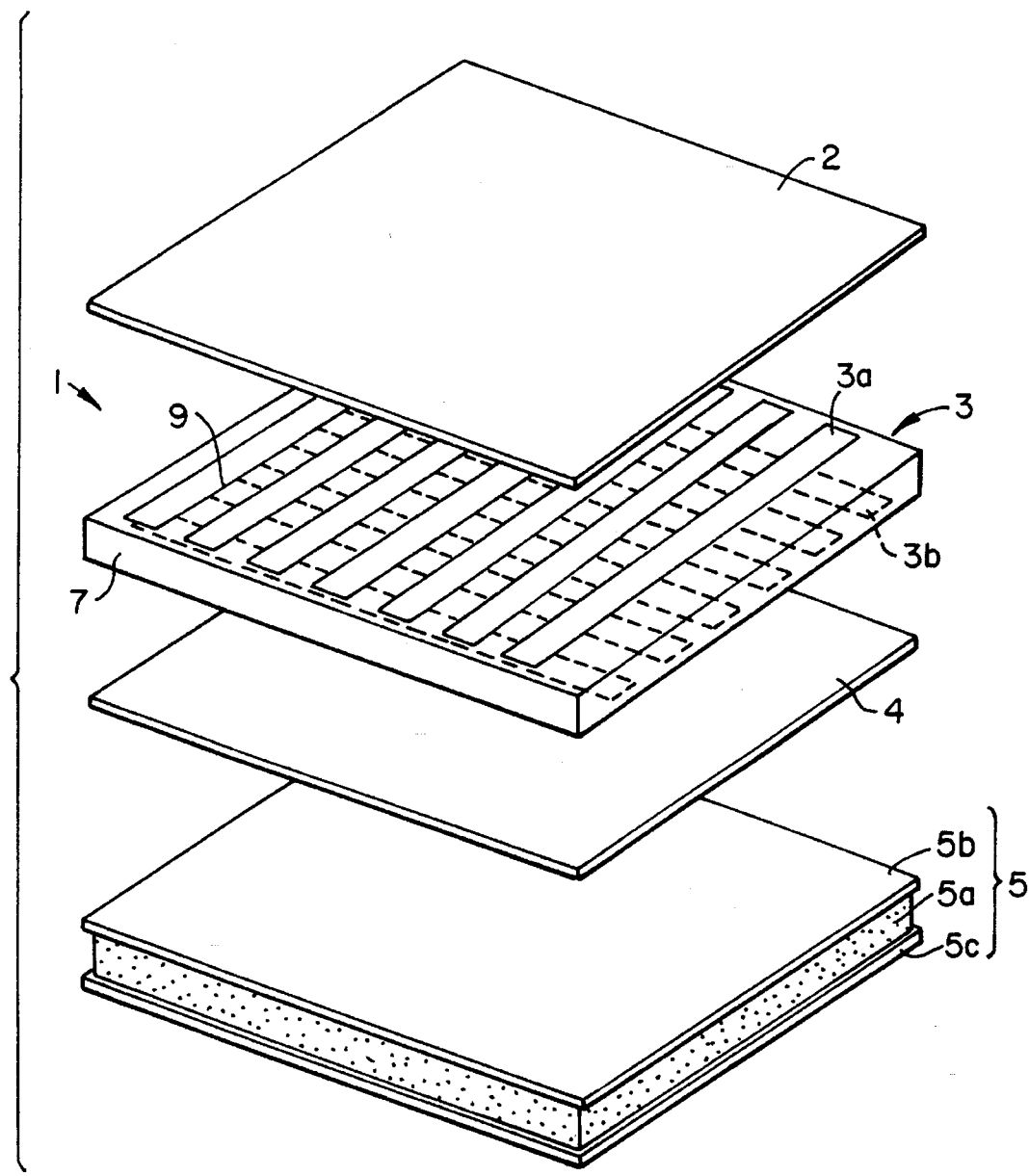
FIG. 1 is a partial exploded perspective view of a surface pressure input panel made according to the principles of the present invention.

Referring to the drawings, wherein like numerals indicate like elements, a surface pressure input panel 1 constructed according to the present invention generally includes a piezoelectric sheet 3 stacked onto a high frequency vibrating body 5 for oscillating the piezoelectric sheet at a given reference frequency.

Figure 2:
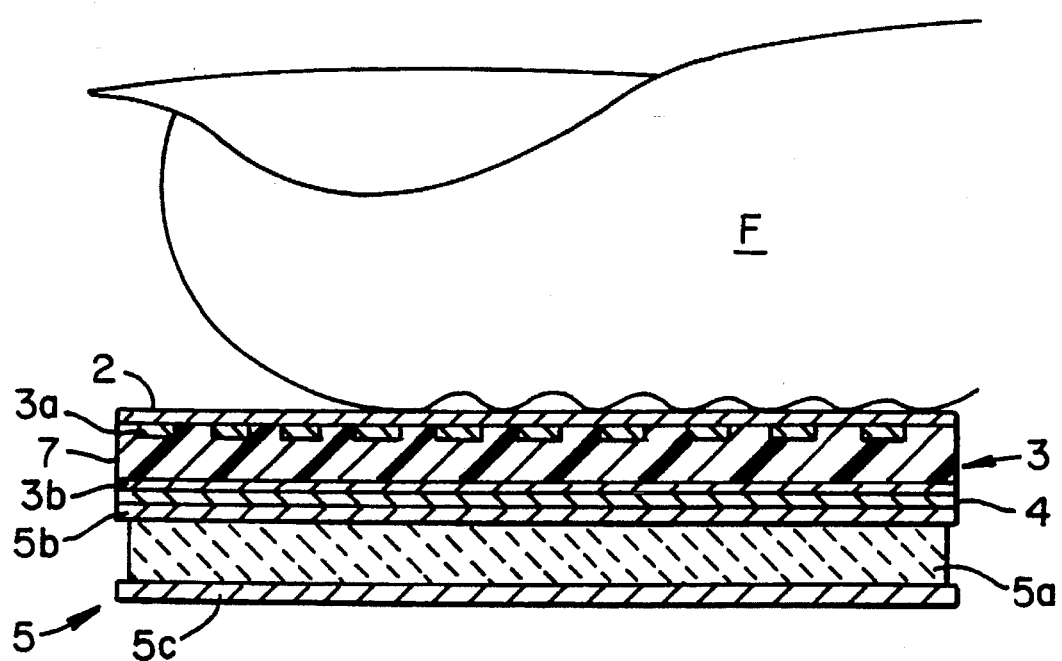
FIG. 2 is a side cross-sectional view of the surface pressure input panel of FIG. 1.

Referring to FIGS. 1 and 2, piezoelectric sheet 3 comprises a resin sheet 7, which may be made of any conventional, readily deflectable, piezoelectric material such as polyvinylidene fluoride, for example. First and second groups of parallel electrode lines 3a and parallel electrode lines 3b are arranged perpendicular to each other (i.e., X and Y lines) and they are formed on the upper and lower surfaces of resin sheet 7, respectively. The electrode lines intersect with each other to form intersection points 9 that will be used as detection points, as discussed below. The electrode lines are preferably constructed by forming, for example by vapor deposition, conductive films, preferably made of a highly conductive material such as aluminum or copper, on both sides of resin sheet 7 and etching the films to form orthogonal electrode lines 3a, 3b.

In a preferred configuration, the interval between adjacent electrode lines 3a and 3b is about 20 to 150 μm. This provides a large number of detection points (intersection points 9) to ensure that relatively small elevation changes on the surface of an object do not occur between adjacent electrode lines, where they might not be detected. It should be noted that the invention is not limited to the configuration described above and shown in FIGS. 1–3. For example, electrode lines 3a, 3b could be oriented at angles other than 90° with respect to each other. In addition, electrode lines 3a, 3b can have larger or smaller intervals between adjacent lines, if desired.

The opposing surfaces of the piezoelectric sheet are covered by insulating layers 2 and 4. Layer 4 insulates piezoelectric sheet 3 from vibrating body 5. Insulating layer 2 is constructed of a material which readily deflects so that it will substantially conform to the contours and surface irregularities of an object that is pressed against it, such as the fingerprint pattern on the inside surface of a fingertip. Insulating layer 2 also protects the user's fingertips from the electrode lines and preferably comprises a conventional insulating material such as polyethylene terephthalate (PET).

Vibrating body 5 is preferably a piezoelectric ceramic plate 5a sandwiched between upper and lower conductive films 5b and 5c. When a high frequency signal is applied across the ceramic plate from one of the conductive films to the other, body 5 will vibrate at a frequency (e.g., 1 Mhz) corresponding to the applied signal. The vibrating body is suitably attached to piezoelectric sheet 3, with a thin layer of an insulating material such as PET therebetween, to form a unit and transmit the oscillations to the sheet so that the sheet vibrates at essentially the same frequency. It should be noted, however, that the invention is not limited to the piezoelectric body described above and other conventional vibrating bodies may be used to oscillate piezoelectric sheet 3.

Figure 3:
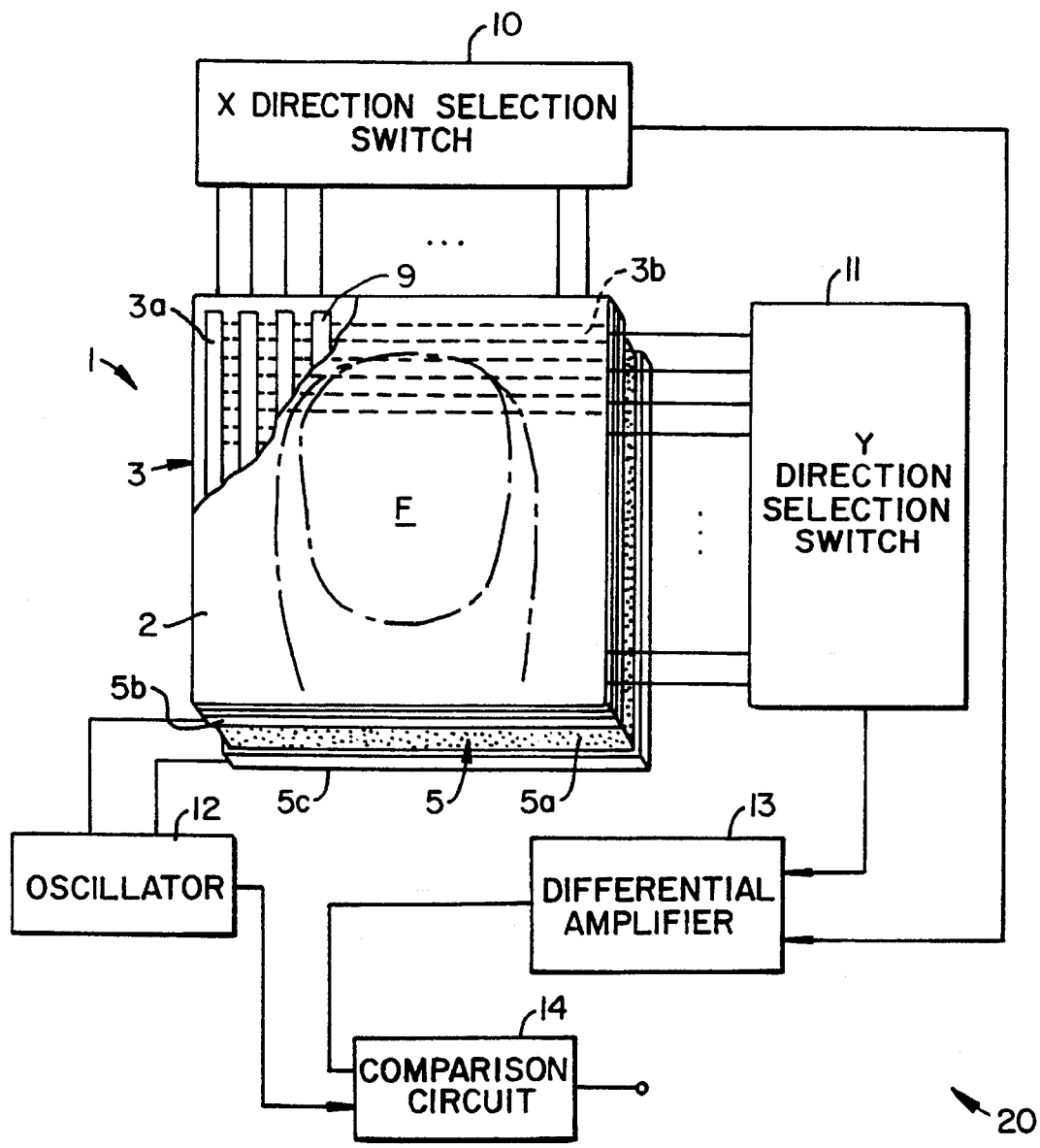
FIG. 3 is a block diagram of a fingerprint detection circuit employing the surface pressure input panel of FIG. 1 according to the present invention.

The pressure surface input panel of the present invention is particularly suitable for detecting a fingerprint pattern on the inside surface of a fingertip F. To accomplish this, input panel 1 is connected to a detection circuit 20, as shown in FIG. 3. The entire detection circuit can be formed on the input panel or sheet 3 can be connected to a separately formed circuit with connectors (not shown). In the preferred embodiment, electrode lines 3a are connected to an X direction selection switch 10 and lines 3b are connected to a Y direction selection switch 11. The X and Y direction switches are configured to cycle through electrode lines 3a, 3b to receive the electrical signals from each individual intersection point 9 as discussed below. The output terminals of X and Y direction switches 10, 11 are connected to a differential amplifier 13 for amplifying the generated electric signals.

An oscillator 12 is operatively connected to conductive plates 5b, 5c to apply a high frequency signal, preferably about 1 Mhz, between the plates of vibrating body 5, thereby causing the vibrating body to continuously oscillate at this frequency. Vibrating body 5 will vibrate piezoelectric sheet 3 at generally the same frequency output by the oscillator. Oscillator 12 and differential amplifier 13 are each connected to a comparison circuit 14 for comparing the output of the X and Y direction switches with the frequency of the oscillator.

When fingertip F is pressed onto surface pressure input panel 1, insulating layer 2 deflects downwardly and eventually touches piezoelectric sheet 3, thereby changing the electrical output of the touched portions of the sheet. These touched portions will typically vibrate at a lower frequency and amplitude than the reference signal. Because the ridge and groove portions of the fingertip have different surface elevations, different pressing forces will act on sheet 3. Thus, the local vibration frequency of the piezoelectric sheet beneath each deflected portion of the insulating layer will vary depending on the amount of pressure applied to the underlying portion of sheet 3. A portion of insulating layer 2 located immediately under or near a ridge portion of fingertip F will undergo a relatively larger deflection and apply a relatively larger pressing force onto the underlying portion of the piezoelectric sheet which, therefore, will vibrate at a frequency that is notably less than the reference frequency. On the other hand, a portion of layer 2 located immediately under or near a groove portion of fingertip F will not deflect at all (or will only slightly deflect) so that the frequency of the underlying portion of the piezoelectric sheet 3 will remain the same as the reference frequency or, if touched, will vary only slightly.

To detect the degrees of pressure applied by the fingertip F to the piezoelectric sheet 3, X direction switch 10 sequentially switches or cycles through electrode lines 3a at a predetermined timing or frequency. Simultaneously, Y direction switch 11 synchronously cycles through electrode lines 3b at the same predetermined timing or frequency to pick up the electrical signals generated by the piezoelectric sheet as a result of its excitation by vibrating body 5 and sequentially transmit them to differential amplifier 13. In one embodiment, Y direction switch 11 cycles through all electrode lines 3b while X direction switch is locked onto a given electrode line 3a. This process is repeated for each electrode line 3a so that the detection circuit can determine the relative location of the electrical signals generated by piezoelectric sheet 3. Of course, this procedure can be reversed (i.e., X direction switch 11 cycles through electrode lines 3a while Y direction switch is locked onto a given electrode line 3b).

The electric signals correspond to the local vibration frequencies of the deflected portions of piezoelectric sheet 3. Following amplification of the signals, they are transmitted to comparison circuit 14. The comparison circuit computes the difference between the electrical signals and the reference frequency from oscillator 12. This difference will generally be proportional to the pressure applied by the surface contours of fingertip F to each respective deflected portion of layer 2. A detector or processor (not shown), coupled to comparison circuit 14, uses conventional signal processing to determine the frequency difference at each intersection portion so that a surface pressure differential, corresponding to the fingerprint pattern of fingerprint F, can be computed and correlated to the locations from which the signals emanate.

The following example is merely illustrative of the present invention and is not intended to limit the surface pressure input panel disclosed herein. Oscillator 12 generates a signal having a frequency of 1 MHz and oscillates vibrating body 5 and piezoelectric sheet 3 at this reference frequency. A fingertip F is pressed onto surface pressure input panel 1 so that insulating layer 2 deflects downwardly and eventually touches portions of piezoelectric sheet 3. Typically, the portions of piezoelectric sheet 3 underneath a groove or concave portion of the fingertip will not be touched by the insulating layer. Therefore, the frequency of these portions will remain at 1 MHz and the comparison circuit will output a difference signal of zero since the local vibration frequencies of these portions are equal to the oscillator's reference frequency.

The portions of piezoelectric sheet 3 underneath a ridge or convex portion of the fingertip, however, will typically be touched by the insulating sheet. These portions will receive varying amounts of pressing pressure, depending on the height and contact area of the ridge, for example, and the local vibration frequencies at these portions will be decreased in a particular instance, for example, to 99980 Hz. The comparison circuit will output 20 Hz and this output is correlated with the intersection point where the convex portion of the fingertip pressed against the piezoelectric sheet. In this manner, it can be determined whether a convex or concave portion of the fingerprint presses against each intersection point 9. By cycling through all of the intersection points, the arrangement of the concave and convex portions of the entire fingerprint can be detected and the sensed fingerprint can be reproduced.

What is claimed is:

1. A surface pressure input panel for detecting surface irregularities in an object comprising:

a pressure sensitive sheet having first and second groups of electrode lines formed thereon and intersecting with each other to form intersection portions; and an element coupled to the sheet for vibrating the sheet at a given reference frequency, the sheet vibrating locally at frequencies that differ from the reference frequency when the surface irregularities of the object are pressed against corresponding portions of the sheet, the sheet being adapted to generate electric signals that represent the local vibration frequencies and to apply the electrical signals to the first and second groups of electrode lines so that a relative location of each generated electrical signal can be determined.

2. The input panel of claim 1 wherein the pressure sensitive sheet is a piezoelectric member comprising a resin plate with the first and second groups of electrode lines formed on opposing surfaces of the sheet.

3. The input panel of claim 1 wherein the element is a high frequency vibrating body adapted to vibrate at the given reference frequency when an electrical signal is applied to the body.

4. The input panel of claim 3 wherein the high frequency vibrating body is a piezoelectric body comprising a ceramic plate disposed between first and second conductive surfaces.

5. The input panel of claim 1 wherein the local vibration frequencies differ from the reference frequency by an amount proportional to the pressure applied by the surface irregularities of the object against corresponding portions of the sheet.

6. The input panel of claim 1 wherein the first and second groups of electrode lines form an x-y grid.

7. The input panel of claim 1 wherein the electrode lines of each group are substantially parallel and spaced approximately 20–150 µm from each other.

8. The input panel of claim 1 further including an insulating film on a surface of the piezoelectric sheet, the film being adapted for receiving a fingertip having an inside surface with contours and to deflect generally in conformity with the contours when the inside surface of the fingertip is pressed against the film.

9. The input panel of claim 1 further including an insulating layer disposed between the piezoelectric sheet and the element to insulate the sheet from the element, the sheet, layer and element being laminated together.

10. An apparatus for use in mapping physical surface irregularities of an object, the apparatus comprising:

a piezoelectric sheet adapted to generate electric signals at a multiplicity of areas distributed over the sheet, the signals representing local vibration frequencies at the areas of the sheet;

means for vibrating the piezoelectric sheet at a given reference frequency; and detecting means for use in sensing the signals and determining the relative locations of the areas where the electrical signals are sensed;

whereby the local vibration frequencies differ from the reference frequency when pressure is applied to corresponding portions of the piezoelectric sheet so that the surface irregularities can be mapped on the basis of the generated electrical signals and the relative locations of the corresponding portions of the sheet.

11. The apparatus of claim 10 wherein the detecting means comprises first and second groups of electrically conductive lines which intersect each other at the areas, the first and second groups of lines being formed on opposing surfaces of the piezoelectric sheet.

12. The apparatus of claim 10 wherein the first and second groups of lines are substantially perpendicular with respect to each other and define an x-y grid of lines.

13. The apparatus of claim 10 wherein the vibrating means is a piezoelectric body adapted to vibrate at the reference frequency when an electrical signal is applied to the body, the body being coupled to the sheet such that the reference vibration frequency is transmitted to the sheet.

14. The apparatus of claim 13 wherein the piezoelectric body comprises a ceramic plate having opposing first and second conductive surfaces, the body vibrating when an oscillating signal is applied to the conductive surfaces.

15. An apparatus for use in mapping physical surface irregularities of an object, the apparatus comprising:

a touch panel including a piezoelectric sheet, first and second groups of electrode lines on opposed, first and second surfaces of the piezoelectric sheet forming intersection portions where the electrode lines of the first and second groups cross, the sheet being adapted to generate electric signals at the intersection portions that represent local vibration frequencies of the sheet and to apply the generated electric signals to the electrode lines, and an element coupled to the sheet for vibrating the piezoelectric sheet at a given reference frequency, whereby the local vibration frequencies differ from the reference frequency when pressure is applied to corresponding portions of the sheet;

an oscillator operatively coupled to the element for vibrating the element at the reference frequency; and a detection circuit operatively coupled to the first and second groups of electrode lines for sensing the generated electric signals and determining the relative locations of the intersection portions where the signals are generated and thereby enable a reconstitution of the surface irregularities of the object.

16. The apparatus of claim 15 further including x-y direction switches coupled to the first and second groups of electrode lines, respectively, for cycling through the electrode lines to transmit the generated electric signals at each intersection portion to the detection circuit.

17. The apparatus of claim 15 wherein the element is a piezoelectric body.

18. A method for detecting a fingerprint pattern from a fingertip comprising the steps of:

vibrating a piezoelectric sheet at a given reference frequency;

pressing the fingertip against the sheet such that surface contours on the fingertip subject portions of the sheet to differing pressures to generate local vibration frequencies at the sheet portions which are responsive to the applied pressures;

detecting the local vibration frequencies; and determining a relative location of the sheet portions where the local vibration frequencies are detected;

whereby the fingerprint pattern can be recreated by correlating the local vibration frequencies with the relative locations of the sheet portions.

19. The method of claim 18 wherein the generating step comprises the step of generating local vibration frequencies which are proportional to the amount of pressure applied to the sheet portions.

20. The method of claim 18 including the step of computing a difference between the given frequency and the local vibration frequencies.

\* \* \* \* \*